US008303685B2

(12) United States Patent
Schubert et al.

(10) Patent No.: US 8,303,685 B2
(45) Date of Patent: Nov. 6, 2012

(54) REGENERATION OF ACID GAS-CONTAINING TREATMENT FLUIDS

(75) Inventors: Craig N. Schubert, Lake Jackson, TX (US); Timothy C. Frank, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1383 days.

(21) Appl. No.: 10/565,466

(22) PCT Filed: Jun. 21, 2004

(86) PCT No.: PCT/US2004/019838
§ 371 (c)(1),
(2), (4) Date: Jan. 20, 2006

(87) PCT Pub. No.: WO2005/009592
PCT Pub. Date: Feb. 3, 2005

(65) Prior Publication Data
US 2006/0178259 A1    Aug. 10, 2006

Related U.S. Application Data

(60) Provisional application No. 60/489,042, filed on Jul. 22, 2003.

(51) Int. Cl.
*B01D 53/14* (2006.01)
(52) U.S. Cl. ............ 95/181; 423/228; 423/229; 95/183; 95/193; 95/209; 95/235; 95/236
(58) Field of Classification Search ............ 502/56; 423/228, 220, 229; 95/172, 181, 183, 193, 95/209, 235, 236, 178, 179
See application file for complete search history.

(56) References Cited

U.S. PATENT DOCUMENTS

| 3,502,428 | A | * | 3/1970 | Gelbein et al. ............ 423/229 |
| 3,563,696 | A | * | 2/1971 | Benson .................... 423/223 |
| 3,690,861 | A | | 9/1972 | Covey et al. |
| 3,709,976 | A | * | 1/1973 | Tarhan ..................... 423/224 |
| 3,906,945 | A | * | 9/1975 | Netteland et al. ........ 128/205.28 |
| 4,152,217 | A | | 5/1979 | Eisenberg et al. |
| 4,160,810 | A | | 7/1979 | Benson et al. |
| 4,189,307 | A | | 2/1980 | Marion |
| 4,242,108 | A | * | 12/1980 | Nicholas et al. ............ 95/166 |
| 4,258,019 | A | | 3/1981 | Hiller et al. |
| 4,299,801 | A | | 11/1981 | Lynn et al. |
| 4,384,875 | A | | 5/1983 | Batteux et al. |
| 4,405,585 | A | | 9/1983 | Sartori et al. |
| 4,452,763 | A | | 6/1984 | Van de Kraats et al. |
| 4,477,419 | A | | 10/1984 | Pearce et al. |
| 4,553,984 | A | | 11/1985 | Volkamer et al. |
| 4,578,094 | A | * | 3/1986 | Mehra ..................... 62/635 |
| 4,780,115 | A | | 10/1988 | Ranke |
| 5,139,621 | A | * | 8/1992 | Alexander et al. ............ 203/54 |
| 5,318,758 | A | * | 6/1994 | Fujii et al. ................. 423/228 |
| 5,435,977 | A | | 7/1995 | Chao |
| 5,660,603 | A | | 8/1997 | Elliot et al. |
| 5,705,090 | A | | 1/1998 | Garland et al. |
| 5,766,548 | A | | 6/1998 | Soria |
| 5,832,712 | A | * | 11/1998 | Rønning et al. ............ 60/783 |
| 5,853,680 | A | * | 12/1998 | Iijima et al. ............... 423/220 |
| 6,090,356 | A | * | 7/2000 | Jahnke et al. ............. 423/210 |
| 6,139,605 | A | * | 10/2000 | Carnell et al. ............. 95/164 |
| 6,203,599 | B1 | * | 3/2001 | Schubert et al. ............ 95/172 |
| 6,337,059 | B1 | | 1/2002 | Schubert et al. |
| 6,497,852 | B2 | * | 12/2002 | Chakravarti et al. ........ 423/228 |
| 6,645,446 | B1 | * | 11/2003 | Won et al. ................. 423/210 |
| 6,838,071 | B1 | | 1/2005 | Olsvik et al. |
| 7,004,997 | B2 | * | 2/2006 | Asprion et al. ............ 95/235 |
| 7,481,988 | B2 | | 1/2009 | Katz et al. |
| 7,637,987 | B2 | * | 12/2009 | Mak ......................... 95/160 |
| 7,674,321 | B2 | * | 3/2010 | Menzel ..................... 95/177 |
| 8,088,292 | B2 | * | 1/2012 | Neumann et al. ........... 210/774 |
| 2002/0007733 | A1 | | 1/2002 | Morrow |
| 2007/0006731 | A1 | | 1/2007 | Menzel |
| 2007/0028774 | A1 | * | 2/2007 | Rochelle .................. 95/236 |

FOREIGN PATENT DOCUMENTS

| AU | 199728540 | | 7/1997 |
| GB | 1484050 | | 8/1977 |
| JP | 10-067994 | * | 8/1996 |
| JP | 10-067994 | * | 3/1998 |
| JP | 10067994 | | 3/1998 |
| JP | 10-067994 | * | 10/1998 |
| RU | 512785 | | 5/1976 |
| WO | WO-01/07147 A | | 2/2001 |
| WO | WO 2005/044955 A1 | | 11/2004 |
| WO | WO-2007/068695 A1 | | 6/2007 |
| WO | 2004080573 | | 9/2009 |

OTHER PUBLICATIONS

"Innovative Stripper Configurations to Reduce the Energy Cost of CO2 Capture" by Gary T. Rochelle, presented at Second Annual Carbon Sequestration Conference, Alexandria, VA, May 5-8, 2003.*
Rochell, G.T., "Innovative Stripper Configurations to Reduce Energy Cost of CO2 Capture," Second Annual Carbon Sequestration Conference, May 5, 2003, Alexandria, VA.
Laurance S. Reid, Round Table Discussion of Gas Sweetening and Related Problems, Mar. 17, 1954, pp. 35 & 36.
Kermit E. Woodcock, Gas, Natural, Kirk-Othmer Encyclopedia of Chemical Technology, 1994.
Freguia and Rochelle, "Modeling of CO2 capture by aqueous monoethanolamine," AIChE J., 49:1676-1686, 2003.
Rochelle and Seibert, "Carbon dioxide capture by absorption with potassium carbonate," Proposal to the Department of Energy, submitted Jul. 23, 2001, granted on Dec. 9, 2002.
Bosch, Neil, "Acid Gas Injection—A Decade of Operating History in Canada", presented at the 14$^{th}$ Annual Conference of the Canadian Gas Processors Suppliers Association, Apr. 5, 2002, 19 pages, Calgary, Alberta.
Kohl, Arthur and Nielsen, Richard, "Gas Purification", 1997, Preface, Chapters 1-3, 14 & 16, 5$^{th}$ Edition, Gulf Publishing Co.

* cited by examiner

Primary Examiner — Duane Smith
Assistant Examiner — Ives Wu
(74) Attorney, Agent, or Firm — Kagan Binder PLLC

(57) ABSTRACT

An improved acid gas regeneration and injection process wherein the separated acid gas stream emerging from a regenerator is compressed and injected into subsurface reservoir, the improvement comprising conducting the acid gas separation in the regenerator under pressure that exceeds 50 psia and does not exceed 300 psia.

10 Claims, No Drawings

REGENERATION OF ACID GAS-CONTAINING TREATMENT FLUIDS

CROSS REFERENCE TO RELATED APPLICATIONS

This application is a 371 of PCT/US2004/019838 filed Jun. 21, 2004, which claims the benefit of U.S. Provisional Application Ser. No. 60/489,042, filed Jul. 22, 2003.

Acid gases are often encountered in natural gas streams, synthesis gas streams and refinery gas streams. Acid gases may also be generated by combustion of carbonaceous materials such as coal, natural gas or other carbonaceous fuels. It is common to use a variety of chemical-based treatment agents to absorb acid gases, in particular carbon dioxide and hydrogen sulfide, from gas or liquid streams that contain them. When such agent becomes acid-gas "rich", the removal (also called absorption) step is typically followed by a regeneration (also called desorption) step to separate acid gases from the active chemicals of the treatment agent.

An overview of the general techniques, as well as numerous chemical absorbents for acid gas treatment, can be found in "Gas Purification" by Arthur Kohl and Richard Nielsen, (Gulf Publishing Co., $5^{th}$ Edition 1997).

The invention concerns aspects of the regeneration and disposal steps of the fluid treatment process, where acid-gases are collected from a regeneration step then subjected to compression. Separated acid gases have been disposed of by compression and injection into subterranean natural gas or petroleum geological formations (normally depleted) or to an ocean- or sea-bed, to avoid atmospheric pollution. One significant advantage of the invention is a reduction of the capital investment in compression equipment needed to attain the pressures often required for such disposal schemes.

A current practices study of acid gas disposal by injection into subsurface reservoirs in Alberta is described in a paper: "Acid Gas Injection—A Decade of Operating History in Canada" presented by Neil Bosch at the $14^{th}$ Annual Conference of the Canadian Gas Processors Suppliers Association, Calgary, Alberta, on Apr. 5, 2002. Four case histories are presented, three of which include acid gas regeneration followed by compression. In these three cases (their FIGS. 5.1, 5.2 and 5.4), acid gases primarily carbon dioxide and hydrogen sulfide) were recovered from the reflux accumulator portion of the amine regeneration unit at pressures between 80 and 90 kPag (26 to 28 psia) and temperatures between 20 and 28 deg. C. (68 to 82 deg. F.). The acid gases were then compressed and injected into subsurface formations, where pressure ranged between 2,300 and 26,900 kpag (350 to 3,900 psia).

A computational study of $CO_2$ removal, regeneration and compression using aqueous monoethanolamine (MEA) is described in a paper "Innovative Stripper Configurations to Reduce the Energy Cost of $CO_2$ Capture" presented by Prof. Gary T. Rochelle at the Second Annual Carbon Sequestration Conference, Alexandria, Va. May 5-8, 2003.

Various configurations of multistage compressors and stripper combinations are discussed with the intention of reducing overall energy consumption in acid gas removal and disposal. Gas off-take is shown at temperatures and pressures varying from 107 to 117 deg. C. (225 to 242 deg. F.) and 2 to 5 atmospheres (30 to 75 psia). There is then shown compression of the stripped $CO_2$ in four or five stages, without any suggestion of reduction in the need for compressors.

The invention is a regeneration Process for an aqueous, acid gas absorption Fluid comprising at least one chemical absorbing Agent for an acid gas, which absorption Fluid contains chemically absorbed acid gas, typically acquired by contacting the Fluid with a gas or liquid stream comprising a) hydrogen sulfide, b) carbon dioxide or c) both said gases, which regeneration Process comprises: 1) stripping one or more acid gases from the acid gas-rich absorption Fluid in a pressure Vessel at a pressure in excess of about 50 psia but not in excess of about 300 psia, thereafter 2) recovering an acid gas-rich gas stream from the Vessel while maintaining the gas stream under said pressure, 3) introducing the gas stream into a compressor, and 4) reducing by compression the volume of said gas stream.

The invention also comprises, in a Process for the removal and recovery of absorbed acid gas from an aqueous treatment Fluid, which Fluid comprises at least one chemically absorbed acid gas and at least one acid gas-absorbing chemical Agent, the reclamation of at least one such Agent from the treatment Fluid, and in which Process the reclamation is conducted in an endothermal Separation Step wherein the Fluid is separated into a) at least one liquid-phase Stream A rich in the absorbing Agent and b) at least one gaseous-phase Stream B rich in the acid gas, and wherein Stream B is thereafter recovered and subjected to compression:

the improvement comprising 1) conducting said Separation Step in a pressure Vessel under pressure that exceeds about 50 psia but does not exceed about 300 psia, while supplying to the Fluid sufficient heat to separate gaseous-phase Stream B from liquid-phase Stream A, and 2) subsequently introducing Stream B under said pressure to the intake of a compressor.

Preferably the invention process is conducted at pressure above about 55 psia, more preferably above about 130 psia and preferably below about 200 psia, more preferably below about 155 psia, in order to attain the benefits of removing one or more stages of compression of a recovered acid gas before its optional injection, at elevated pressures, for environmentally acceptable disposal. Also preferably, injection to an ocean- or sea-bed or into a subsurface geological formation follows after the compression of the acid gas stream.

Acid Gases

The term "acid gas" is used to refer to a gas encountered in "sour" natural gas streams, synthesis gas streams, refinery gas or liquid streams, petroleum reservoirs or coal seams, or that is generated from combustion of carbonaceous materials (for example coal, natural gas or other carbonaceous fuels). Those materials often contain sulfurous components. Aerobic combustion of carbon results in generation of, among other gases, carbon dioxide. The gases most commonly removed from sour gas or liquid streams are carbon dioxide ($CO_2$) and hydrogen sulfide ($H_2S$). Other examples of acid gases include carbonyl sulfide, mercaptans and other sulfides.

Treatment Agents

Treatment Agents employed in the invention are those commonly employed to remove acid gases, either partially or completely and either selectively or non-selectively, from gas or liquid streams. It is often desirable and well known, to selectively remove one or more acid gases and in an optional, separate step to remove one or more different acid gases from the same stream.

Chemical Solvent Agents

So-called "chemical solvents" employed in the invention for acid gas absorption are selected from a group of chemicals that effect their attraction for the acid gas by formation of a chemical salt or complex with the gas. The regeneration of such a "chemical solvent" and recovery of the "absorbed" acid gas is then effected by reversing the chemical interaction, most commonly through the application of heat at reduced pressure.

Preferred categories of such "chemical solvents" can generally be described as nitrogen-based solvents, and in particular primary, secondary and tertiary alkanolamines; primary and secondary amines; sterically hindered amines; and severely sterically hindered secondary aminoether alcohols, as defined in U.S. Pat. No. 4,405,585. Examples of commonly used solvents are: monoethanolamine (MEA); diethanolamine (DEA); diisopropanolamine (DIPA); N-methylethanolamine (MMEA); triethanolamine (TEA); N-methyldiethanolamine (MDEA); piperazine; N-methylpiperazine (MP); N-hydroxyethylpiperazine (HEP); 2-amino-2-methyl-1-propanol (AMP); 2-(2-aminoethoxy)ethanol (also called diethyleneglycolamine or DEGA); 2-(2-tert-butylaminopropoxy)ethanol; 2-(2-tert-butylaminoethoxy)ethanol (TBEE); 2-(2-tert-amylaminoethoxy)ethanol; 2-(2-isopropylaminopropoxy)ethanol; and; 2-(2-(1-methyl-1-ethylpropylamino)ethoxy)ethanol. The foregoing may be used individually or in combination, and with or without other co-solvents, such as the "physical" solvents noted below.

The amounts of the chemical solvents to be employed are readily determined by those skilled in sour gas treatment techniques. Generally, the amount of the chemical solvents will be approximately 15 to 70 percent by weight of the aqueous treatment Fluid and will be utilized-at their highest practical concentration, subject to corrosion, viscosity, degradation, hydrocarbon co-absorption, foaming and other constraints unique to each chemical and each sour gas composition. Preferably, they are employed in amounts of more than about 20, more preferably more than about 40 weight percent up to about 70, more preferably up to about 60 weight percent.

Of the nitrogen-based chemical solvent Agents commonly employed for acid gas treatment MEA, DEA, TEA, DIPA, MDEA, piperazine, MP, HEP, DEGA, AMP and TBEE are preferred for invention use. More preferred are MEA, DEA, TEA, MDEA, piperazine, DEGA and TBEE.

Other Co-Solvent Agents

So-called "physical" solvents (or "co-solvents" for acid gases are optionally used in the invention to supplement the effect of the chemical solvents noted above. They are selected from a group of chemicals that effect their attraction for the acid gas by a true solvent/solute interaction. Such treatment Agents will be effective to the extent of the solubility of the acid gas(es) in question in the hybrid (that is, chemical and physical solvents) treatment Fluid. The regeneration of such a hybrid Fluid and recovery of the "physically and chemically absorbed" acid gas, is then effected.

Examples of "physical" co-solvents to be suitably employed are: methanol; $C_1$ to $C_3$ alkyl mono- and di-ethers of ethylene and, preferably, the higher polyoxyalkylene (for example, diethylene, triethylene, tetraethylene, pentaethylene, hexaethylene, heptaethylene, octaethylene, nonaethylene, undecaethylene, etc.) glycols, and in particular the di-methyl ethers of same; cyclotetramethylene sulfone-derivatives (the unsubstituted species commonly called sulfolane); propylene carbonate; N-substituted alkyl pyrimidinones, for example, 1,3-dimethyl-3,4,5,6-tetrahydro-2(1H)-pyrimidinone (DMPU); N-substituted alkyl pyrrolidinones, for example, 1-methyl-2-pyrrolidinone (NMP); morpholine; aliphatic acid amides, for example acetamide, dimethylformamide, dimethylacetamide, N-formylmorpholine and N-acetylmorpholine. Such physical co-solvents can be used individually or in combinations with the above chemical solvents. Combinations and respective amounts of components are suitably selected by the artisan according to the nature of the sour gas stream to be treated.

Treatment Equipment

Equipment for absorption of acid gases is of relatively standard design, and well known in the gas treatment art. For example, see Chapter 2 of "Gas Purification" Kohl and Nielsen, supra. The equipment normally consists of an absorption vessel, often referred to as the "absorber". In it, using trays or packing, the untreated (that is, "sour") gas stream containing one or more acid gases is contacted with the treatment Fluid. Counter-current contact is preferably employed.

In a gas sweetening process, the absorption operation is normally followed by a regeneration, also called "desorption" or "stripping" step. The purpose of the regeneration step is to prepare the Agent for re-use by removing dissolved and reacted acid gas components acquired by the treatment Fluid in the absorption stage. Regeneration is normally conducted in much the same type of equipment as the initial absorption step, in a vessel constructed to withstand and sustain the temperatures and pressures employed. Such a regeneration vessel is desirably a tubular-shaped vessel made from steel or other suitable construction materials, selected to resist corrosive effects of the acid gases and treatment Fluid components and to perform properly at the temperatures and pressures to be employed. Trays and/or packing are suitably specified, to provide intimate gas-liquid contact.

Many designs for regeneration vessels have been proposed and employed. One simple apparatus design and arrangement for operation to absorb acid gas, then regenerate the treatment Fluid, is shown and described in U.S. Pat. No. 4,452,763 and another in FIG. 1 of U.S. Pat. No. 4,405,585. Adaptation with appropriate construction materials, to withstand the selected operating environment, would render those apparatuses suitable for use in the invention. Other common designs may be employed as the regeneration vessel in the invention process. For example if recycle lines are employed, such lines and connections would be specified and constructed to withstand the operating conditions, for example, pH levels, flow rates, temperatures and pressures under which the process is to be conducted.

Designs which solely employ pressure reduction (that is, "flash") for removal of acid gases from treatment Fluid will not be suitable for practice of this invention. Such designs do not typically include a heat input device, such as a reboiler.

Treatment Fluid

The treatment Fluid used in the invention process is formulated for the particular acid gases in the stream and the desired purity level of the product stream. Agents typically used to chemically remove acid gases from a "sour" gas stream in aqueous-base chemical treatment Fluid, formulated for the desired results, may be used. For example, if selective removal of $H_2S$ in the presence of $CO_2$ is desired, one may employ MDEA. Alternatively, other Agents such as MEA, DEA piperazine, DIPA, etc., singly or in combination, may be used to remove $H_2S$, $CO_2$ and other contaminants in varying degrees.

For different removal objectives, another chemical Agent or combination of Agents may readily be selected by one skilled in the acid gas-absorption art from the wide range of Agents known to be operable. The absorption step is important to the invention only to the extent that the nature of the chemical Agents in the treatment Fluid stream and the acid gases it absorbs will determine what combination of operation pressure and temperature are best employed to attain a desired degree of regeneration of the treatment Fluid and the related separation of acid gases. Because boiling points of the solvents and co-solvents to be used are significantly greater than those of the acid gases to be separated from them, choice of specific solvents is of little consequence to implementation of the invention. Their selection may be made based primarily upon their respective effectiveness in the initial absorption step of the treatment process. With a knowledge of the intended chemical composition of the treatment Fluid, a chemical engineer experienced in acid gas absorption and regeneration can readily determine what the operating conditions will be.

Regeneration or Desorption Step

The regeneration step is carried out by conducting the acid gas-rich treatment Fluid from the absorption unit to the inlet of the regeneration vessel, preferably near the top of a vertical column and allowing that Fluid to gravity-feed down the length of such column. By supplying heat at the bottom of the column, typically to a "reboiler" attached there, heat is imparted to acid gas-rich treatment Fluid causing vapors, commonly steam, to be generated. The vapors rise through this stripper column, carrying the acid gas(es) being desorbed, to the overhead space of the column. From that point the gas stream is conducted from the column through a suitable conduit. It may be subjected to a condensation stage to remove any low boiling vapor remaining with the acid gas(es). This may be accomplished by a cooling jacket near the outlet of the column or in a reflux condenser downstream from the regeneration vessel.

In the invention, the regeneration vessel ("stripper") is equipped with one or more pressure control devices to regulate the increase in pressure of gases desorbed from the treatment Fluid and carried to the outlet of the regeneration column. By employing such a control device, pressure at the outlet of the vessel is raised to exceed about 50 psia, preferably to exceed 55 psia and more preferably to exceed 130 psia, but to remain below about 300 psia, preferably below about 200 psia and more preferably below about 155 psia. Operating pressure maxima are engineered into the design of the regeneration vessel, by sizing the outlet conduit in such a manner to provide up to the desired maximum pressure for the known treatment Fluids and acid gases, under the flow rate and heat load/temperature and other system operating conditions at which regeneration is typically conducted, plus an appropriate safety margin. Such outlet sizing can be accomplished by the artisan using standard engineering design calculations. Operating pressure control is then suitably maintained by the use of one or more standard process fluid flow control valves, installed downstream from the gas stream outlet of the stripper column. Most commonly, the valve is found in the outlet line of a reflux accumulator tank that typically follows a condensation stage just after the column's outlet. The control valve is normally tied, through a pressure transducer, to a pressure sensor mounted in the outlet from the stripper. Consequently, a desired operating pressure can be maintained automatically through the servomechanism of such pressure control valve.

Surprisingly, as may be seen in more detail in Specific Embodiment examples, with the increase in pressure, the desired operating temperatures are attained without the input of significantly more heat than when operating at what previously have been considered normal operating conditions. Such previous conditions have been 10-25 psia and outlet temperatures of approximately 105-120 deg C. (220-250 deg F.)

Recovery and Disposal Steps

After recovery from the outlet of the regeneration vessel, the lean treatment Fluid is suitably recycled, with any appropriate make-up solvent or co-solvent added, to the absorption step and reused. The recovered acid gas stream, maintained under the specified pressure of 50 to 300 psia, preferably of 55 to 200 psia, is conducted from the outlet of the regeneration vessel to the first stage compressor for a pressure boost, and then to any subsequent stage(s) of compression, to reduce the acid gas(es)' volume and increase pressure to a point where it can be suitably pumped into the permanent disposal chamber or, if desired, utilized for other purposes. Typically, the ultimate desired pressure will be dictated by the hydrostatic pressure of a subterranean disposal chamber or formation or by the depth of the ocean/seabed to which it will be pumped. If there is significant residual water and light hydrocarbon, for example, propane or butane, or other condensable gas in the recovered acid gas stream coming from the regeneration vessel, before a compression stage it often desirable to subject the gas stream to a condensation step to remove such other higher boiling condensable vapors, and thereby effectively reduce the overall compressor load.

All reported percentages are by weight, unless otherwise stated. Example A relates one of the four case histories from the Bosch paper, supra. Examples 1 and 2 are invention embodiments, using injection conditions and fluids found in the Bosch West Pembina history for regeneration, but applying the invention pressure requirements. Comparison of the process conditions and overall regeneration energy requirements of the 3 examples, as well as for subsequent compression stages in preparation for injection of the treated gases to the West Pembina formation, are found in Table 1 and demonstrate that one or more compression stages can be omitted from the overall injection process described.

EXAMPLE A

Comparison

The regeneration and compression conditions of the West Pembina acid gas injection facility, described as the fourth history in the Bosch paper, referenced in the Background section above, are taken for comparative purposes. An acid gas-rich, 43 weight percent MDEA, 57 weight percent water (gas free basis) treatment Fluid containing 0.35 moles acid gas per mole amine at 180 deg. F., as absorbed from the natural gas stream treated at West Pembina, Alberta, is heated by cross exchange and regenerated. The resulting acid gas is cooled, dried and compressed to about 1065 psia using four stages of compression and cooling. (The operating parameters are taken as reported from Bosch's Table 5.4).

Cross exchange (that is, using heat in the regenerated Fluid to pre-heat the acid-gas laden treatment Fluid at the inlet of the desorption step) is accomplished with a standard lean-rich exchanger sized to provide a 35 deg. F. "approach" (that is, temperature of the reboiler unit less that at the stripper inlet). The resulting exchanger duty is 5.9 MMBTU/hr and the resulting stripper feed temperature is 207 deg. F. Regeneration is carried out in a 20 tray regeneration column equipped with reboiler, condenser and reflux accumulator. Reboiler duty is 24.8 MMBTU/hr, pressure drop across the trays is 2 psi and pressure drop across the reflux condenser is 1 psi. Following Bosch, the vapor phase emerging from the reflux condenser passes through a separation chamber (where water and condensed gases are removed) and then is directed to the first stage of compression, where the pressure is increased from 23 psia to 50 psia. This vapor is cooled, passed to a second separation chamber and directed to the second stage of compression, where the pressure is increased from 49 psia to 129 psia. This vapor is cooled, passed to a third separation chamber and directed to the third stage of compression, where the pressure is increased from 128 psia to 390 psia. This vapor is cooled, passed to a fourth separation chamber and directed to the fourth stage of compression where the pressure is increased from 384 psia to 1065 psia. This final vapor is cooled to liquid form for pumping into the subsurface formation. In total, approximately 787 HP of compression, spread over four compression stages, are required to dispose of 312 lb-mole/hr acid gas.

EXAMPLE 1

One Compression Stage Elimination

In the manner described in Example A, regeneration of the same acid gas-rich treatment Fluid is conducted, except that the pressure in the reflux accumulator is increased to 52.4 psia. Since the same 3 psi pressure drop is maintained across the combined reflux condenser and 20 regeneration trays, the reboiler pressure increases from 29.3 psia in Example A to 55.4 psia. This increase in reboiler pressure forces the reboiler temperature to increase to about 294 F. Since the lean-rich cross exchanger approach remains constant at 35 F, and since the reboiler duty remains constant at 24.8 MTU/hr, the lean-rich exchanger duty increases from 5.9 MMBTU/hr in Example A to 18 MMBTU/hr. Under these conditions, while the reflux temperature remains constant at 80.6 F, the reflux condenser duty increases from 9.1 MMBTU/hr in Example A to about 12 MMBTU/hr.

The vapor stream emerging from the reflux accumulator at 52.4 psia passes through a separation chamber and is directed to the first stage of compression where the pressure is increased from 49 psia to 129 psia. This vapor is cooled, passed to a second separation chamber and directed to the second stage of compression, where the pressure is increased from 128 psia to 389 psia. This vapor is cooled, passed to a third separation chamber and directed to the third stage of compression, where the pressure is increased from 384 psia to 1065 psia. As in Example A, the final vapor is cooled to liquid form for pumping into the subsurface formation. In total, approximately 618 HP of compression, spread over three compression stages, are required to dispose of 314 lb-mole/hr acid gas.

EXAMPLE 2

Two Compression Stages Elimination

A regeneration of the same treatment Fluid is conducted in the same manner as described in Example A. However, in this example the pressure in the reflux accumulator is increased to 132 psia. Since the same 3 psi pressure drop is maintained across the combined reflux condenser and 20 regeneration trays, the reboiler pressure therefore increases from 29.3 psia in Example A to 135 psia. This increase in reboiler pressure forces the reboiler temperature to increase to about 358 F. Since the lean-rich cross exchanger approach remains constant at 35 F, and since the reboiler duty remains constant at 24.8 MMBTU/hr, the lean-rich exchanger duty increases from 5.9 MMBTU/hr in Example A to about 36 MMBTU/hr. Under these conditions, while the reflux temperature remains constant at 80.6 F, the reflux condenser duty increases from 9.1 MMBTU/hr in Example A to about 16MMBTU/hr.

The vapor stream emerging from the reflux accumulator at 132 psia passes through a separation chamber and is directed to the first stage of compression, where the pressure is increased from 128 psia to 390 psia. This vapor is cooled, passed to a second separation chamber and directed to the second stage of compression, where the pressure is increased from 384 psia to 1065 psia. As in Example A, the final vapor is cooled to liquid form for pumping into the subsurface formation. In total, approximately 406 HP of compression, spread over two compression stages, are required to dispose of 315 lb-mole/hr acid gas.

Inspection of the above Examples and Table 1 indicates operating the regeneration step as described above allows regeneration, compression and disposal of the same amount of acid gas with considerably less compression. If desired, reboiler duty heat input can be kept approximately constant by allowing the lean-rich exchanger size to grow. Since the capital and operating costs associated with lean-rich exchangers are generally small compared to the capital and operating costs associated with compression, use of the invention allows a more cost effective regeneration and disposal of acid gases.

For the sake of generating comparative examples, the reboiler duty is in all cases held constant at 24.8 MMBTU/hr and the lean-rich exchanger approach is held at 35 deg F. However, inspection of Table 1 suggests the condenser duty, a measure of the "left-over" heat after regeneration, increases as the reflux accumulator pressure increases. Surprisingly, regeneration at higher pressure and higher temperature requires less energy input. Routine optimization by one skilled in the art captures additional savings by reducing the reboiler heat input (operating cost savings) and/or increasing the 35 deg F. approach on the lean-rich exchanger (capital cost savings by reduction in size of that exchanger).

Full details of the relevant operating parameters, of each of the foregoing Examples, are summarized in following Table 1.

TABLE 1

Effect of Reboiler Pressure on Selected Plant Variables
(@ constant reboiler duty, 35 deg F. exchanger approach)

|  | Ex. A | Ex. 1 | Ex. 2 |
|---|---|---|---|
| Reflux Accumulator P (psia) | 26.3 | 52.4 | 132 |
| Hot Lean T (deg F.) | 255 | 294 | 358 |
| Hot Lean P (psia) | 29.3 | 55.4 | 135 |
| Lean-Rich Exchanger Duty (MMBTU/hr) | 5.9 | 18 | 36 |
| Stripper Feed Inlet T (deg F.) | 207 | 259 | 323 |
| Stripper Overhead Outlet T (deg F.) | 217 | 259 | 322 |
| Reflux Cooler Duty (MMBTU/hr) | 9.1 | 12 | 16 |
| Reboiler Duty (MMBTU/hr) | 24.8 | 24.8 | 24.8 |
| Compressor 1 (HP) | 169 | 0 | 0 |
| Compressor 2 (HP) | 211 | 211 | 0 |
| Compressor 3 (HP) | 231 | 232 | 233 |
| Compressor 4 (HP) | 176 | 175 | 173 |
| Total Compression (HP) | 787 | 618 | 406 |
| Cooler 1 (MMBTU/hr) | .48 | 0 | 0 |
| Cooler 2 (MMBTU/hr) | .65 | .62 | 0 |
| Cooler 3 (MMBTU/hr) | .80 | .81 | .85 |
| Cooler 4 (MMBTU/hr) | Pc | Pc | Pc |
| Total Cooling (MMBTU/hr) | 1.93 | 1.43 | .85 |
| Concentration Lean $H_2S$ (m/m MDEA) | 0.0052 | 0.0033 | 0.0004 |
| Concentration Lean $CO_2$ (m/m MDEA) | 0.0034 | 0.0039 | 0.0056 |

Pc = Phase change due to differing estimates of where the 2-phase region for high pressure blends of $CO_2$ and $H_2S$ starts. These duties are discarded, as this aspect of the operation does not affect the conclusions presented significantly.

Examination of Table 1 yields the following observations regarding elimination of the first stage of compression (Ex. 2 vs. Ex. A):
  Elimination of the first stage of compression reduces the total compression requirement from 787 HP to 618 HP, a reduction of about 21 percent.

Elimination of the first stage of compression requires the reboiler pressure to increase from 29.3 to 55.4 psia. This, in turn, increases the reboiler temperature from 255 F to 294 F.

The higher reboiler temperature combined with the 35 F approach requirement forces the exchanger duty to increase from 5.9 to 18 MMBTU/hr.

Surprisingly, if the reboiler duty is kept constant at 24.8 MMBTU/hr the condenser duty increases from 9.1 to 12 MMBTU/hr, despite the large change in temperature and pressure noted above. To the extent condenser duty reflects "left over" regeneration heat, routine optimization would allow lower reboiler duties and/or a smaller lean rich exchanger.

Elimination of the first stage of compression also eliminates the need for about 0.5 MMBTU/hr vapor phase cooling.

Examination of Table 1 yields the following observations regarding elimination of the first and second stages of compression (Ex. 3 vs. Ex. A):

Elimination of the first two stages of compression reduces the total compression requirement from 787 HP to 406 HP, a reduction of about 48 percent.

Elimination of the first two stages of compression requires the reboiler pressure to increase from 29.3 to 135 psia. This, in turn, increases the reboiler temperature from 255 F to 358 F.

The higher reboiler temperature combined with the 35 F approach requirement forces the exchanger duty to increase from 5.9 to 36 MMBTU/hr.

If the reboiler duty is kept constant at 24.8 MMBTU/hr the condenser duty increases from 9.1 to 16 MMBTU/hr. To the extent condenser duty reflects "left over" regeneration heat, routine optimization would allow lower reboiler duties and/or a smaller lean rich exchanger.

Elimination of the first two stages of compression reduces the vapor phase cooling requirement by about 1.1 MMBTU/hr

The invention claimed is:

1. A regeneration Process for an aqueous, acid gas-rich absorption Fluid comprising at least one nitrogen-based chemical absorbing Agent for an acid gas, which absorption Fluid contains a chemically absorbed acid gas comprising a) hydrogen sulfide, b) carbon dioxide or c) both of said gases, said Process comprising 1) stripping acid gas from the acid gas-rich absorption Fluid in a pressure Vessel operated at a pressure in excess of about 50 psia and below about 300 psia, wherein heat is supplied to the Fluid in the Vessel by a reboiler in a sufficient quantity that the Fluid is at a temperature from 294° F. and below 400° F. to desorb pressurized gases at a pressure in the range of about 50 psia to below about 300 psia that are carried to an outlet of the Vessel, and thereafter 2) recovering an acid gas-rich gas stream from the outlet of the Vessel while maintaining the stream under a pressure in the range from 50 psia to 300 psia, wherein a control valve downstream from the outlet is used to control the operating pressure of the Vessel, and 3) introducing said gas stream into a first stage compressor to increase the pressure and reduce by compression the volume of said recovered gas stream.

2. The process of claim 1 where at least one Agent in the treatment Fluid is an alkanolamine, comprising from 2 to 6 carbon atoms.

3. The process of claim 1 where at least one Agent is selected from the group consisting of ethanolamine; diethanolamine; diisopropanolamine; triethanolamine; N-methyldiethanolamine; piperazine; N-methylpiperazine; N-hydroxyethylpiperazine; 2-(2-aminoethoxy)ethanol; 2-(2-text,-butylaminoethoxy)ethanol; and 2-amino-2-methyl-lpropanol.

4. The process of claim 2 where, included in the Fluid, is at least one co-solvent for acid gases selected from the group of:
a) methanol; and
b) individually or in combination $C_1$-$C_3$ alkyl mono- and di- ethers of ethylene, diethylene, triethylene, tetraethylene, pentaethylene, hexaethylene, heptaethylene, octaethylene, nonaethylene, and undecaethylene glycol; and
c) individually or in combination propylene carbonate; 1,3-dimethyl-3,4,5,6-tetrahydro-2(1H)-pyrimidinone; sulfolane; 1-methyl-2-pyrrolidinone; morpholine; N-formylmorpholine; and N-acetylmorpholine.

5. The process of claim 1, where the recovered gas stream is, after compression, disposed by injection to an ocean- or sea-bed or into a subterranean chamber or formation.

6. The process of claim 3 where, included in the Fluid, is at least one co-solvent for acid gases selected from the group of:
a) methanol; and
b) individually or in combination $C_1$-$C_3$ alkyl mono- and di- ethers of ethylene, diethylene, triethylene, tetraethylene, pentaethylene, hexaethylene, heptaethylene, octaethylene, nonaethylene, and undecaethylene glycol; and
c) individually or in combination propylene carbonate; 1,3-dimethyl-3,4,5,6-tetrahydro-2(1H)-pyrimidinone; sulfolane; 1-methyl-2-pyrrolidinone; morpholine; N-formylmorpholine; and N-acetylmorpholine.

7. The process of claim 1 wherein the stripping acid gas from the acid gas-rich absorption Fluid takes place in a pressure Vessel at a pressure in excess of about 55 psia and below about 300psia.

8. The process of claim 1 wherein the stripping acid gas from the acid gas-rich absorption Fluid takes place in a pressure Vessel at a pressure in excess of about 130 psia and below about 300 psia.

9. The process of claim 1 wherein the stripping acid gas from the acid gas-rich absorption Fluid takes place in a pressure Vessel at a pressure in excess of about 50 psia and below about 200 psia.

10. The process of claim 1 wherein the stripping acid gas from the acid gas-rich absorption Fluid takes place in a pressure Vessel at a pressure in excess of about 50 psia and below about 155 psia.

* * * * *

(12) EX PARTE REEXAMINATION CERTIFICATE (10461st)
United States Patent
Schubert et al.

(10) Number: US 8,303,685 C1
(45) Certificate Issued: Jan. 5, 2015

(54) REGENERATION OF ACID GAS-CONTAINING TREATMENT FLUIDS

(75) Inventors: Craig N. Schubert, Lake Jackson, TX (US); Timothy C. Frank, Midland, MI (US)

(73) Assignee: Dow Global Technologies LLC, Midland, MI (US)

Reexamination Request:
No. 90/013,095, Dec. 13, 2013

Reexamination Certificate for:
Patent No.: 8,303,685
Issued: Nov. 6, 2012
Appl. No.: 10/565,466
Filed: Jan. 20, 2006

(21) Appl. No.: 90/013,095

(22) PCT Filed: Jun. 21, 2004

(86) PCT No.: PCT/US2004/019838
§ 371 (c)(1),
(2), (4) Date: Jan. 20, 2006

(87) PCT Pub. No.: WO2005/009592
PCT Pub. Date: Feb. 3, 2005

Related U.S. Application Data

(60) Provisional application No. 60/489,042, filed on Jul. 22, 2003.

(51) Int. Cl.
*B01D 53/14* (2006.01)

(52) U.S. Cl.
CPC ........ *B01D 53/1425* (2013.01); *B01D 53/1456* (2013.01); *B01D 53/1493* (2013.01)
USPC ............... 95/181; 423/228; 423/229; 95/183; 95/193; 95/209; 95/235; 95/236

(58) Field of Classification Search
None
See application file for complete search history.

(56) References Cited

To view the complete listing of prior art documents cited during the proceeding for Reexamination Control Number 90/013,095, please refer to the USPTO's public Patent Application Information Retrieval (PAIR) system under the Display References tab.

*Primary Examiner* — Elizabeth McKane

(57) ABSTRACT

An improved acid gas regeneration and injection process wherein the separated acid gas stream emerging from a regenerator is compressed and injected into subsurface reservoir, the improvement comprising conducting the acid gas separation in the regenerator under pressure that exceeds 50 psia and does not exceed 300 psia.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *